(12) United States Patent
Tameno et al.

(10) Patent No.: US 8,082,616 B2
(45) Date of Patent: Dec. 27, 2011

(54) SHOE BOTTOM REPAIR AGENT AND SHOE BOTTOM REPAIR SET UTILIZING THE SAME

(75) Inventors: Norihiro Tameno, Takatsuki (JP);
Tetsuya Fujino, Takatsuki (JP);
Yoshimasu Tanaka, Takatsuki (JP);
Shinji Ochi, Takatsuki (JP); Hidekuni Takano, Takatsuki (JP)

(73) Assignee: Sunstar Engineering Inc., Takatsuki-shi (JP)

( * ) Notice: Subject to any disclaimer, the term of this patent is extended or adjusted under 35 U.S.C. 154(b) by 702 days.

(21) Appl. No.: 11/658,849

(22) PCT Filed: Jul. 26, 2005

(86) PCT No.: PCT/JP2005/013653
§ 371 (c)(1),
(2), (4) Date: Nov. 24, 2008

(87) PCT Pub. No.: WO2006/011482
PCT Pub. Date: Feb. 2, 2006

(65) Prior Publication Data
US 2009/0077757 A1    Mar. 26, 2009

(30) Foreign Application Priority Data

Jul. 30, 2004  (JP) ................. 2004-223240
Jul. 30, 2004  (JP) ................. 2004-224104

(51) Int. Cl.
*A43D 5/00*     (2006.01)
*A43D 11/00*    (2006.01)
*C08G 18/00*    (2006.01)
*C08L 75/12*    (2006.01)

(52) U.S. Cl. .......... 12/142 Q; 12/103; 528/44; 525/452; 36/25 R (58) Field of Classification Search ................. 12/142 Q, 12/142 R, 103; 36/25 R; 528/44; 525/452
See application file for complete search history.

(56) References Cited

U.S. PATENT DOCUMENTS

| | | | | |
|---|---|---|---|---|
| 1,641,689 A | * | 9/1927 | Petersen | 12/142 RS |
| 2,961,707 A | * | 11/1960 | Stewart | 425/119 |
| 5,276,981 A | * | 1/1994 | Schaffer et al. | 36/34 R |
| 2009/0077757 A1 | * | 3/2009 | Tameno et al. | 12/103 |
| 2010/0230879 A1 | * | 9/2010 | Watanabe et al. | 267/292 |

FOREIGN PATENT DOCUMENTS

| | | |
|---|---|---|
| JP | 52-76149 | 6/1977 |
| JP | 8-253226 | 10/1996 |
| JP | 9-112195 | 4/1997 |
| JP | 2002-60552 | 2/2002 |

* cited by examiner

*Primary Examiner* — Marie Patterson
(74) *Attorney, Agent, or Firm* — Kratz, Quintos & Hanson, LLP (57) ABSTRACT

There is provided a shoe bottom repair agent consisting of one-component thermosetting composition comprising as main ingredients a terminal isocyanate having urethane prepolymer and/or a polyisocyanate compound and a latent curing agent. This shoe bottom repair agent is free from, experienced in use of solvent base shoe bottom repair agents, safety and sanitation problems such as odor and inflammation by solvent evaporated at the time of curing as well as cured matter thickness reduction of a mended part caused by solvent evaporation. With use of this shoe bottom repair agent, damaged shoe bottom portion can be mended to a desired shape through one-time repair work. Short-time curing can be effected by heating. Further, before heating, there is substantially no viscosity increase and no surface film is formed to avoid adhesion of a film resulting from surface drying to a spatula. Therefore, the repair surface can be finished smoothly and neatly.

21 Claims, 8 Drawing Sheets

SHOE BOTTOM REPAIR AGENT AND SHOE BOTTOM REPAIR SET UTILIZING THE SAME

TECHNICAL FIELD

The present invention relates to a shoe bottom repair agent for mending worn portions, damaged portions, or lost portions, etc. of shoe soles or heels, etc. and to a shoe bottom repair set utilizing the same.

BACKGROUND ART

As a shoe bottom repairing method, a method to repair a shoe bottom by pasting a crescent-shaped or semi-circular rubber sheet configured to be heavier-walled as it moves to the outer circumferential side to a heel portion of the shoe bottom by an adhesive is extensively adopted. However, because the wearing condition of the heel portion varies in accord with the way of walking and the period of service, etc., there is a problem that the shoe bottom is unable to be repaired to the optimum condition with ready-made rubber sheets of a uniform shape.

Therefore, recently, as a method to repair the shoe bottom, particularly, the heel portion, there proposed is a method to mount a molding form (patterning plate) around a heel, to inject epoxy resin, urethane resin, or other two-component type, polyamide, polypropylene, polyethylene, or other high-temperature solution, or rubber latex, rubber solution, or other repair agent in the molding form, and to naturally dry or harden the repair agent at room temperature or by heating (for example, see Patent Document 1). As the shoe bottom repair agent, cold-setting type material with solvent dissolved in synthetic rubber is commercially available, and a shoe bottom repair agent containing, for example, a: rubber such as natural rubber, styrene butadiene rubber, butadiene rubber, isoprene rubber, chloroprene rubber, acrylonitrile-butadiene rubber, and other diene-based synthetic rubber and b: reinforcer such as aluminum silicate, calcium silicate, ammonium carbonate, barium sulfate, magnesium carbonate, calcium oxide, talc, carbon black, whisker, iron oxide, mica, silica, titanium dioxide, zinc oxide, glass fiber, carbon fiber, etc. and benzene, xylene, toluene, n-hexane, or other hydrocarbon solvent in the ratio of 35 to 65% by weight, and preferably 40 to 60% by weight (see Patent Document 2).

On the other hand, as a packaging container that houses goods, there proposed is a packaging container composed of a case proper which has a housing unit to place the goods and plastic sheets equipped with cover members which are supported free to open and close via a fold line on both side portions of the case proper (for example, see Patent Document 3).

Patent document 1: Japanese Unexamined Patent Publication No. 52-76149

Patent document 2: Japanese Unexamined Patent Publication No. 2002-60552

Patent document 3: Japanese Unexamined Patent Publication No. 8-253226

DISCLOSURE OF THE INVENTION

Problems to be Solved by the Invention

The conventionally publicly known shoe bottom repair agent as described above is of a cold-drying or setting type and a damaged shoe bottom portion can be mended by applying it to the repair portion of the shoe bottom or injecting it into a cast-molding formed by a mold form, letting it stand at room temperature, and drying and curing. However, with the solvent-based cold-setting type repair agent as described above, the solvent odor which volatilizes at the time of curing is not only disliked but also volatilization of solvent causes safety and sanitation problems. In addition, it takes a time to dry and harden and furthermore, the repaired portion (cured portion and build-up portion) tends to be contracted and deformed (reduced wall thickness) because the solvent in the repair agent volatilizes as the agent dries and hardens, and there remain problems that it is unable to repair (recover) shoe bottoms to desired shapes through one-time repair work and that the repair work must be repeated.

It is an object of the present invention to provide a shoe bottom repair agent which can solve the problems in the conventional shoe-bottom repair agents as described above, which is free from safety and sanitation problems caused by solvent volatilization at the time of curing, which can be cured in a short time, and at the same time is free from deformation shrinkage, and which can repair (recover) the shoe bottom to a desired shape through one-time repair work, and to provide a shoe-bottom repair set which alleviates troubles of repair work and which can improve the operability.

Means to Solve the Problems

The shoe bottom repair agent related to the present invention is characterized by consisting of a one-component thermosetting composition composed with terminal isocyanate group containing urethane prepolymer and/or polyisocyanate compound and a latent curing agent as main ingredients. The repair method of shoe bottom using this shoe-bottom repair agent is to, first of all, apply or inject the shoe-bottom agent of the present invention on or into a damaged portion (repair portion) resulting from wearing or chipping and to cast-mold (build up) into a desired shape. Then, the portion formed by the repair agent (build-up portion) is preferably immersed in a heating liquid tank and heated. By this heating, the latent curing agent is activated and the terminal isocyanate group containing urethane prepolymer and/or polyisocyanate compound is addition-polymerized and cured.

As the latent curing agent, it is preferable to use inactivated amine compounds. As the latent curing agent with amine compounds inactivated, the solid amine compound with powders fixed on the surface and inactivated (in the present invention, called the "powder coating amine"), a complex with boron halide added to an amine compound (in the present invention, called the "latent curing catalyst complex"), or an amine compound blocked with homopolymer or copolymer of phenols which have a polymerizable double bond (in the present invention, called the "block amine") can be used.

The latent curing agent (powder coating amine) with powder affixed to the solid amine compound surface and inactivated can be easily dispersed in terminal activated isocyanate group containing urethane prepolymer or isocyanate compounds in a stable state and superb storage stability can be obtained, and at the time of heat-hardening, the surface coated solid amine compound generates activated amino group by heat-melting, and the constituent gives rise to curing.

Furthermore, the latent curing agent composed with the complex with boron halide added to the amine compound exhibits excellent stability at low-temperature and at the same time, is activated by heating and hardens the constituent.

Furthermore, the latent curing agent with the amine compound blocked by the homopolymer or copolymer of phenols containing polymerizable double bond moisture-cures the constituent with the moisture in air even at room temperature, but achieves the extremely slow and stable curing speed, and is easy to dissociate and cures the constituent in a short time by heating.

The shoe bottom repair set related to the present invention is equipped with a shoe-bottom repair agent container with the shoe-bottom repair agent filled, a formwork sheet for cast-molding, spatula for surface finish, etc. and a packaging container having a container proper which houses the shoe-bottom repairing tools such as the shoe-bottom repair agent containers with a curing tank and housing recessed portion which functions as a curing tank to store hot water or warm water to cure the shoe-bottom repair agent when the worn, damaged, or lost portions of a shoe bottom is repaired, and provides a shoe-bottom repair set that can restore and repair the worn, damaged, and lost portions of a shoe bottom easily and in a short time.

Because in this shoe-bottom repair set, a shoe-bottom repair agent which can cure in a short time by immersing the shoe-bottom repair agent in hot water or warm water is used, by applying, injecting, and cast-molding a required amount of the shoe-bottom repair agent to the required place and immersing the shoe-bottom repair portion in hot water or warm water, the shoe-bottom repair agent is cured in a short time of, for example, a few minutes and the shoe bottom can be restored and repaired. Consequently, it is not necessary to store shoes over a long period of time with care to prevent other things from coming in contact with this shoe-bottom repair portion after applying, injecting, and cast-molding the repair agent, and burden of the user can be alleviated and it is not necessary to prepare substitute shoes while repairing. Furthermore, because when the shoe-bottom repair agent is cured in hot water or warm water, it is possible to carry out the operation by immersing the shoe-bottom repair portion in hot water or warm water stored in the curing tank and housing recessed portion, it is possible to impart two functions to the curing tank and housing recessed portion of the shoe-bottom repair set; that is, a function as a container to store the shoe-bottom repair tools and a function as a curing tank to store hot water or warm water. Consequently, since a container of a shape fitted to shoe-bottom repairing can be adopted as the container proper, as compared to the case in which a washball popularly found in general household is used as a container, it becomes possible to support in midair the shoe bottom repair portion in good stability with the shoe bottom repair portion floated in hot water or warm water, and operability of repair work can be improved.

In this event, it is possible to install a support means to the shoe-bottom repair set to support the shoe in such a manner that the shoe-bottom repair portion of the shoe to be repaired is immersed in hot water or warm water stored in the curing tank and the housing recessed portion, and as this kind of support means, a cover member can be equipped to the packaging container. When the shoe bottom is immersed in hot water or warm water in order to restore and repair the shoe bottom with the shoe-bottom repair agent and to cure the shoe-bottom repair agent, it is possible to configure the support means to support the shoe with a member different from the packaging container, but as is the case of the present invention, using the cover member of the packaging container of the shoe-bottom repair agent set can eliminate the need to use other member, can save trouble of shoe-bottom repair work, and enable simple shoe-bottom repair work.

As the support means, it is possible to use a support means configured in such a manner that a cover member that opens and closes the curing tank and housing recessed portion is rotatably installed at least on one side of the packaging container, the top end portion of the counter part of the shoe is latched to the raised cover member with a clip, and the shoe-bottom repair portion can be immersed in hot water or warm water stored in the curing tank and the housing recessed portion.

In the event that as the cover member, a pair of cover members which open and close the curing tank and housing recessed portion are rotatably installed to both sides of the packaging container, the length of one cover member is set to be longer than the other cover member, and the top end portion of the counter part of a high-heeled shoe is able to be latched to the longer-side cover member with a clip and the top end portion of the counter part of a low-heeled shoe is able to be latched to the shorter side cover member with a clip, it is possible to latch even ladies' high-heeled shoe or low-heeled shoe of leather shoes, sneakers, etc. to the cover member with a clip, and the shoe-bottom repair agent formed by coating, injecting, and cast-molding to the shoe-bottom repair portion can be cured in the same manner.

In the event that as the cover member, a cover member that opens and closes the curing tank and housing recessed portion is rotatably installed to one side along the longitudinal direction of the packaging container, and the top end portions of counter parts of right and left shoes are able to be latched to the raised cover member with clips, it is possible to immerse the shoe bottoms of one pair of right and left shoes simultaneously in hot water or warm water stored in the curing tank and the housing recessed portion, and the shoe-bottom repair work can be carried out in a short time.

Because as the support means, a support wall which supports the halfway portion of the length direction of a shoe is formed in the packaging container, the shoe can be supported in such a manner that the shoe-bottom repair portion is stabilized.

Because the shoe-bottom repair agent container is located nearly at the center of the width direction of the curing tank and housing recessed portion so that its longitudinal direction is set as the vertical direction and the cap is located on the downside, the stability can be improved when the shoe-bottom repair set can be displayed at the store.

Because a cover member which opens and closes the curing tank and housing recessed portion is rotatably installed to at least one side of the packaging container and a protrusion is formed in the cover member to fix and hold the shoe-bottom repair agent container at a predetermined position inside the curing tank and the housing recessed portion, the position of the shoe-bottom repair agent container in the packaging container can be prevented from being displaced due to vibrations at the time of transportation or during display work, and the shoe-bottom repair tools including the shoe-bottom repair agent container can be housed highly attractively.

Because a cover member is rotatably installed at least to one side of the packaging container and in the cover member, an opening is formed to pour hot water or warm water into the curing tank and housing recessed portion, it is possible to easily pour hot water or warm water safely from a kettle or a thermos popularly found in general household.

EFFECT OF THE INVENTION

The shoe-bottom repair agent of the present invention scarcely contains any solvent and is free from safety and sanitation problems such as odor, ignition, etc. of solvents which volatilizes during curing or problems of deformation shrinkage (reduced wall thickness) of hardened material (molding) caused by solvent volatilization as is the case of the conventional solvent-based shoe-bottom repair agents, and can repair the damaged shoe-bottom portion to a desired shape (restore to the original shape) through one-time repair work, and at the same time, it is cured in a short time by heating; therefore, it does not have to be dried and cured over a long period of time of several hours to several days as is the case of the conventional cold-setting repair agents. Furthermore, the conventional cold-setting type repair agents has a problem of difficulty in finishing a repaired surface to be smooth and neat because on the surface, the solvent is volatilized in a short time and dried and easily forms a film as the viscosity increases with time when the agent is applied, injected, and cast-molded to the shoe bottom, and when the surface shape of the repaired portion is fixed up with a spatula, the repair agent film adheres and the pockmarked surface is generated. As against these, in the case of the shoe-bottom repair agent of the present invention, an increase of viscosity scarcely occurs before heat is applied and the surface film is difficult to be formed, no surface-dried film adhere to the spatula, and the surface can be finished smoothly and neatly.

Use of amine compounds as the latent curing agent allows the hardened material to be hardened moderately, achieves superb adhesion and wear resistance, and produces the repaired portion with good durability.

The shoe-bottom repair method using the repair agent of the present invention is to apply, inject, and cast-mold the shoe-bottom repair agent to the cast-molding mold formed by a formwork to the shoe-bottom repair portion, then, to immerse in a heating liquid tank and cure the shoe-bottom repair agent, and then, remove the formwork, and can be particularly suitably used for repairing worn-out shoe heel portion.

According to the shoe-bottom repair set related to the present invention, the shoe bottom can be restored and repaired easily and in a short time without taking too much trouble. Because the shoes do not have to be stored over a long period of time with care to prevent this repaired portion from coming in contact with other substance after applying, injecting, and cast-molding the shoe-bottom repair agent, burdens of users can be alleviated and no substituted shoes are necessary to be prepared, shoes can be repaired easily. In addition, since the curing tank and housing recessed portion of the packaging container to house the shoe-bottom repair tools of the shoe-bottom repair set can be utilized as a curing tank to store hot water or warm water at the time of shoe-bottom repairing, the shoe-bottom repair portion can be supported in midair to the curing tank with good stability, and the repair work does not require much time, and operability is improved as compared to the case of using a washball popularity found in general household.

Now, because the top end portion of the raised cover member is latched to the top end portion of the counter part of a shoe by a clip by use of the cover member installed to the packaging container as the support means for supporting in midair the shoe in such a manner that the shoe-bottom repair portion of the shoe to be repaired is immersed in hot water or warm water stored in the curing tank and housing recessed portion, and the shoe-bottom repaired agent is cured in hot water or warm water stored in the curing tank, it can be configured to support in midair the heel portion with the repair agent applied, injected, and cast-molded to the shoe bottom. In this way, the claimed invention can impart two functions of: a function as a container that houses shoe-bottom repair tools; and a function as a curing tank to cure the shoe-bottom repair agent to the curing tank and housing recessed portion of the packaging container while adopting a simple configuration, and in the event that it is used as a curing tank, the invention can support the shoe stably to a proper position.

Furthermore, providing a pair of cover members with varying lengths as the cover members of the packaging container of the shoe-bottom repair set can support a high-heeled shoe to the longer-side cover member and a low-heeled shoe to the shorter-side cover member, and can stably support both high-heeled shoe and low-heeled shoe to a proper position in such a manner that the shoe bottoms are immersed in hot water or warm water stored in the curing tank and the housing recessed portion.

In addition, installing a cover member on one side along the longitudinal direction of the packaging container enables the right and left shoes to be supported to the cover member side-by-side and the repaired portions of both shoes to be simultaneously immersed in hot water or warm water, thereby reducing the processing time of shoe-bottom repair work by hot water by half.

As the support means, a support wall that supports the halfway portion in the length direction of the packaging container is formed, a shoe is set on the support wall, and the heel portion of the shoe can be immersed in hot water or warm water. This kind of support wall can support a shoe still more stably by a combined use of the cover member.

Now arranging the repair agent container nearly at the center part of the width direction of the curing tank and the housing recessed portion in such a manner that the longitudinal direction is set as the vertical direction and the cap is located downside enables the packaging container of the shoe-bottom repair set to be displayed by hanging in a balanced manner. In addition, even when the curing tank and housing recessed portion which houses the shoe-bottom repair agent container is utilized as a curing tank that stores hot water or warm water, the packaging container can be set stably on a horizontal place, and danger of tilting and overturning to spill hot water can be eliminated, and the shoe-bottom repair portion can be supported to a stable state. Even in the event that the shoe-bottom repair set is dropped from the display shelf of the store onto the floor, etc., since the cap is arranged with the cap directed downside, spillage of the shoe-bottom repair agent from the shoe-bottom repair agent container can be effectively prevented.

Providing a cover member at least on one side of the packaging container of the shoe-bottom repair set and forming a protrusion to the cover member for fixing and holding the shoe-bottom repair tools can prevent the position of the shoe-bottom repair agent container in the packaging container from being varied by the vibrations at the time of transportation or during display work, and the shoe-bottom repair tools including the shoe-bottom repair agent container can be housed highly attractively.

It is preferable to pour hot water or warm water with a shoe set to the curing tank and housing recessed portion of the packaging container of the claimed invention and at the same time to the curing tank for curing the shoe-bottom repair agent with care to prevent the temperature from lowering, but since the shoe is arranged on the upper side of the curing tank and the housing recessed portion, it becomes troublesome to pour hot water. Therefore, installing a cover member at least to one side of the packaging container and forming an opening to the cover member for pouring hot water or warm water into the curing tank and the housing recessed portion enables hot water or warm water to be poured into the curing tank and the housing recessed portion without being hampered by the shoe.

BRIEF DESCRIPTION OF THE DRAWINGS

FIGS. 1(a) and (b) are illustrations showing the shape and the size of a molding of a shoe-bottom repair agent;

| Description of Reference Numerals | |
|---|---|
| H | Heel portion |
| S | Shoe |
| SB | Shoe bottom |
| K | Counter |
| 1 | Shoe-bottom repair set |
| 2 | Hot water or warm water |
| 3 | Shoe-bottom repair agent |
| 4 | Shoe-bottom repair tools |
| 5 | Packaging container |
| 6 | Support means |
| 10a | Cap |
| 10 | Shoe-bottom repair agent container |
| 11 | Gloves |
| 12 | Emery paper |
| 13 | Formwork sheet for cast molding |
| 14. | Spatula |
| 15 | Clip |
| 20 | Curing tank and housing recessed portion |
| 21 | Container proper |
| 21a | Integral hinge |
| 22a | Holding protrusion |
| 22 | Long-size cover member |
| 23 | Short-size cover member |
| 23a | Holding protrusion |
| 24 | Fit protruded portion |
| 25 | Insertion hole |
| 26 | Flange portion |
| 27 | Fit recessed portion |
| 28 | Knob portion |
| 29 | Loading table |
| 30 | Loading table |
| 29a | Recessed portion |
| 30a | Holding recessed portion |
| 31 | Level difference portion |
| 32 | Reinforcement protrusion |
| 33 | Hook hole |
| 34 | Repaired surface |
| 35 | Adhesive tape |
| 5A | Packaging container |
| 20A | Curing tank and housing recessed portion |
| 21A | Container proper |
| 22A | Cover member |

BEST MODE FOR CARRYING OUT THE INVENTION

First, a shoe bottom repair agent will be described.

The shoe bottom repair agent related to the present invention contains a one-component thermosetting composition having a terminal isocyanate group containing urethane prepolymer and/or polyisocyanate compound and a latent curing agent as main ingredients and wearing resistance improving reinforcer, filler, catalyst, dye pigment, water-absorbing agent, age resister, antioxidant, plasticizer, etc. compounded arbitrarily in moderate quantities.

Explanation is made on the terminal isocyanate group containing urethane prepolymer and polyisocyanate compound (hereinafter collectively called the "isocyanate component"). For the isocyanate component used in the present invention, there is no particular restriction, and for example, the thermosetting compound disclosed in, for example, U.S. Pat. No. 3,131,224 may be used.

The terminal isocyanate group containing urethane prepolymer (hereinafter called the "terminal NCO containing prepolymer") used in the present invention can be manufactured by allowing an excess amount of polyisocyanate compound to react with the regular polyole component in such a manner that the equivalent ratio of, for example, OH/NCO becomes 1/1.2 to 3.5. The reaction is, in general, conducted under the conditions of room temperature or 60 to 90° C. for 1 to 7 hours, as required, in the presence of reactive catalysts, for example, organic tin-based catalyst such as dibutyltin dilaurate, bismuth-based catalyst such as bismuth octylate, tertiary amine based catalyst such as 1,4-diaza[2.2.2]bicyclooctane, etc. The obtained terminal NCO containing prepolymer is, in general, set to 0.5-5% by weight for the terminal NCO content and 5000-500000 cps/about 20° C. for the viscosity.

Examples of the polyole component include polyether polyoles with alkylene oxide such as propylene oxide or propylene oxide and ethylene oxide, etc. addition-polymerized to polyalcohol such as water, ethylene glycol, propylene glycol, glycerin, trimethyrolepropane, pentaerythritol, sorbitol, sucrose, etc.; ethylene glycol, propylene glycol and oligoglycols of these; butylene glycol, hexylene glycol, polytetramethylene ether glycols; polycaprolactone polyoles; polyesterpolyoles such as polyethylene adipate, etc.; polybutadiene polyoles; higher aliphatic acid esters having hydroxyl group such as castor oil, etc.; polymer polyoles with polyether polyoles or polyester polyoles grafted with vinyl monomers.

In addition, as the polyisocyanate compound, optional polyisocyanate compounds which belong to aromatic, aliphatic, or alicyclic are used. Examples include tolylene diisocyanate (TDI), diphenylmethandiisocyanate (MDI), 3,3'-dimethyl-4,4'-biphenylendiisocyanate, 1,4-phenylenediisocyanate, xylylene diisocyanate, tetramethylxylene diisocyanate, naphthylene diisocyanate, dicyclohexylmethane-4,4-diisocyanate, crude TDI, crude MDI, polymethylene polyphenylisocyanate, isophorone diisocyanate, hexamethylene diisocyanate, hydrogenated xylylene diisocyanate, isocyanurate of these, carbodiimide, biuret-modified substances of these, and others, and a mixture of one kind or two kinds or more of these may be used.

In the present invention, as the isocyanate component, the terminal NCO containing prepolymer and the polyisocyanate compounds may be used separately, respectively, or may be concomitantly mixed and used. In particular, the mixture of terminal NCO containing prepolymer with polyisocyanate compound are preferably concomitantly used in the ratio of 1/2 to 10/1. In the event that the ratio of the polyisocyanate compound increases from 1 to 2, the cured matter tends to become harder and fragile, and in the event that the ratio of the terminal NCO containing prepolymer increases from 10 to 1, the hardness of cured matter tends to lower, which is not desirable for characteristics of the shoe bottom. By the way, the ratio of concomitant use of the polyisocyanate compound can be optionally designed and mixed by the molecular design of terminal NCO prepolymer.

Next explanation will be made on the latent curing agent used in the present invention. This latent curing agent is inactive at room temperature and is activated by heating and the one-component thermosetting composition according to the present invention is cured. In the present invention, as the latent curing agent, inactivated amine compounds such as powder coating amine with powder firmly fixed to the surface of the solid amine compound and inactivated, complexes with boron halide added to the amine compounds, or block polyamine with the polyamine compounds blocked by homopolymers or copolymers of phenols which have a polymerizable double bond are suitably used.

For the latent curing agent (powder coating amine) with powders firmly fixed to the surface of solid amine compounds and inactivated, the thermosetting composition disclosed, for example, in U.S. Pat. No. 3,131,224 can be used. For the solid amine compound used for this powder coating amine, optional amine compounds which belong to aromatic or aliphatic of melting point not less than 50° C. and not more than 150° C., and preferably not more than 120° C. are used. Examples include aromatics of 4,4'-diaminodiphenylmethane, 2,4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-tollylendiamine, 2,4-tolylendiamine, 2,5-tolylenediamine, 2,6-tolylendiamine, 3,4-tolylendiamine, and others, and aliphatics of 1,12-dodecandiamine, 1,10-decandiamine, 1,8-octanediamine, 1,14-tetradecandiamine, 1,16-hexadecandiaine, etc., and mixtures of 1 kind or 2 kinds or more of these could be used. These solid amine compounds shall have the center grain diameter adjusted to be not more than 20 μm and preferably to 3 to 15 μm. At the center grain size which exceeds 20 μm, incomplete reaction curing results and the desired physical properties may not be obtained.

As the powder to be coated to the solid amine compounds, the powders may be optionally used from the inorganic system or the organic system. For the inorganic system, titanium oxide, calcium carbonate, clay, silica, zirconia, carbon, alumina, talc, etc. can be mentioned, and as the organic system, polyvinyl chloride, polyacrylic resin, polystyrene, polyethylene, etc. can be mentioned, and a mixture of one kind or two kinds or more of these may be used. The consumption rate is such that the weight ratio of the solid amine compound to the powder should be 1/0.001 to 0.5, and preferably 1/0.002 to 0.4. In the event that the powder ratio is less than 0.001, effects of cold (storage) stability are unable to be recognized, and in the event that it exceeds 0.5, the stability is unable to be improved more than that.

The above-mentioned powder coating amine is manufactured by a shear friction type mixing system, in which the solid amine compound is being crushed to a predetermined center grain size range, while at the same time, powder is added to this, and the powder is mixed and crushed to achieve a predetermined center grain size range, and the powder is firmly fixed to the surface of the solid amine compound. In addition, the solid amine compound pulverized in advance may undergo a high-speed impact type mixing agitator or compression shear type mixing agitator together with the powder to form powder coating amine, and this system, particularly, the system to use the high-speed impact type mixing agitator is preferable to the shear friction type mixing system. It is assumed that by mixing and grinding the solid amine compound and powders in this way, static electricity is generated and powders are fixed to the solid amine compound surface, or by the heat generated by frictions, impacts, compressive shear, etc. generated by mechanical force of the mixing agitator, powders may be fixed due to localized melting and fixing phenomena of the solid amine compound, or to the solid amine compound surface, powders are physically brought up or buried and fixed, or furthermore, by chemically activating and fixing, the active amino group ($NH_2$) on the surface of the solid amine compound is coated with powder fines and inactivated. By the way, the center grain size of the fixed powders should be 2 μm or less, and preferably 1 μm or less, and when it exceeds 2 μm, powders are difficult to be fixed to the solid amine compound surface.

This powder coating amine is activated by heating and works as a curing agent of the isocyanate component, but it may be further allowed to react with liquid isocyanate compound and the remaining active amino group may be inactivated. Examples of the liquid isocyanate compounds include crude MDI, p-toluenesulfonyl isocyanate, isophoronediisocyanate, TDI, n-octadecyl isocyanate, and others. The ratio of the liquid isocyanate compound is, in general, selected in such a manner that the equivalent ratio of $NH_2$ and NCO of the solid amine compound to be 1/0.01 to 0.5. By inactivation treatment by this kind of liquid isocyanate compound, as compared to the coating treatment only by the powder, cold (storage) stability is further improved. By the way, in the event that NCO is less than 0.01 in the equivalent ratio, the desired improvement effects of storage stability are unable to be obtained, and even in the event that the ratio exceeds 0.5, further improvement in the storage stability is unable to be achieved.

Powder coating amine obtained by coating treatment by powders as described above and furthermore by inactivation treatment by the liquid isocyanate compound is activated at the curing temperature (in general, 60-100° C.) and $NH_2$ which exists after heat-activation gets involved in curing reaction with NCO, the isocyanate component. Consequently, the compounding ratio of the isocyanate component to powder coating amine as a latent curing agent is chosen in such a manner that the equivalent ratio of $NH_2$ to NCO after heat-activation becomes 1/0.5 to 2.0.

Now, the latent curing agent comprising a complex with boron halide added to the amine compound is described. For this latent curing agent, for example, the latent curing catalyst complex disclosed in U.S. Pat. No. 3,051,415 may be used. As the amino compound, amine, alkylhydrazine, and imidazole can be mentioned, and as amine, octyldimethylamine, benzyldimethylamine, N,N-dimethylamine, pyridine, triethylamine, trimethylamine, N,N, N', N'-tetramethyl-1,4-butanediamine, triisooctylamine, and piperizine can be mentioned. In addition, for boron halide, trifluoroborane, and furthermore, boron tribromide can be mentioned. The complex as the latent curing agent is manufactured by dissolving the amine compound and boron tribromide in an anhydrous solvent, for example, hexane, and vigorously stirring to react. The complex with boron halide added to the amine compound as the latent curing agent in the one-component thermosetting composition of the shoe-bottom repair agent of the present invention is compounded to the terminal NCO containing prepolymer and/or polyisocyanate compound in the ratio of $NH_2/NCO$=0.7 to 2.0.

Furthermore, as the latent curing agent with the amine compound blocked by the homopolymer or copolymer of phenols having the polymerizable double bond (hereinafter called the "block amine"), for example, the one-component thermosetting polyurethane composition disclosed in U.S.

Pat. No. 2,765,587 may be used. The block amine used for this latent curing agent is manufactured by melt-mixing the amine compound with a homopolymer or copolymer of phenols with the polymerizable double bond (hereinafter called the "phenolic polymer"), then, cooling, and pulverizing by a crusher or paint rolls as required. The ratio of the polyamine compound to phenolic polymer (weight ratio) is selected generally in the range of 1/0.8 to 4, and preferably, in the range of 1/1 to 3.

Examples of the polyamine compound include 1,3-diaminopropane, 1,3-diaminobutane, 1,4-diaminobutane, 1,5-diaminopentane, hexamethylenediamine, N,N'-diethylendiamine, N,N, N',N'-tetramethylbutandiamine, 1,7-bis(dimethylamino)heptane, isophorondiamine, bis(4-dimethylaminophenyl)methane, triethylenetetramine, tetraethylenepentamine, diethylenetriamine, etc.

Furthermore, examples of the phenols with polymerizable double bond include vinyl-substituted phenol (o-vinylphenol, m-vinylphenol, p-vinylphenol, etc.) or their halogen-substituted derivatives; aryl-substituted phenol (2-arylphenol, 4-arylphenol, etc.); 1-propenyl-substituted phenol [o-(1-propenyl)phenol, m-(1-propenyl)phenol, p-(1-propenyl) phenol, etc.] or their halogen-substituted derivatives, acrylic unsaturated group containing phenols with acid halide of phenolic hydroxide group containing carboxylic acid of salicylic acid, p-hydroxybenzoic acid, etc. reacted with hydroxyalkylacrylate or 2-hydroxyethylmethacrylate. The homopolymer of these phenols or copolymers with other ethylene-unsaturated monomer are used for phenolic polymers. These phenolic polymers provide the melting point of 120-180° C., and preferably 130-160° C. When the melting point is less than 120° C., cold (storage) stability is degraded and when it exceeds 180° C., the curing rate not only becomes slow but high-temperature heating is required for curing.

The compounding rate of the block amine as the latent curing agent is $HN_2/NCO=0.7$ to 1.5 and preferably 0.8 to 1.3 for the isocyanate components (terminal isocyanate group containing urethane prepolymer and polyisocyanate compound). When it is less than 0.7 or exceeds 1.5, insufficient curability will result.

By the way, the one-component thermosetting composition used for the present invention shall contain the isocyanate component and the latent curing agent as main ingredients, but in order to improve the physical properties of cured matter, particularly, wear resistance and durability, bifunctional or more epoxy resin may be added in a suitable amount. For the epoxy resin, bisphenol A type, F type, AD type, phenol type, cresol type, cyclic aliphatic system, glycidyl ester system, glycidyl amine system, etc. can be mentioned, and in particular, liquid form is preferable. By the addition of these epoxy resins, reactions of the epoxy resin and the latent curing agent take place in addition to the reaction of the isocyanate component and the latent curing agent during heat-curing, and the web structure is formed on the basis of this three-dimensional reaction, and a molding by the shoe bottom repair agent with tough durable properties provided is thereby formed. In such event, epoxy resin is used in the range of 1 to 15 parts by weight with respect to 100 parts by weight of the isocyanate component. If the amount is less than 1 part by weight, effects by addition of epoxy resin is unable to be expected and if it exceeds 15 parts by weight, rubber properties of the cured matter may be impaired.

The one-component thermosetting composition used for the shoe-bottom repair agent related to the present invention is prepared by compounding a predetermined amount of one kind or two kinds or more chosen from the powder coating amine, latent curing catalyst complex or block amine as the latent curing agent to the isocyanate component such as the terminal isocyanate group containing urethane prepolymer and/or polyisocyanate compound as main ingredients and further by compounding suitably and in a suitable amount of wear resistance improving reinforcer, filler, catalyst, dye and pigment, water absorbent, age resistor, antioxidant, plasticizer, etc. as required. This one-component thermosetting composition is stable at room temperature and provides excellent storage stability, and can form cured matter in a short time at heating temperature of 70° C. or higher and lower than 100° C. and can finish repairing of a shoe bottom.

Furthermore, in the shoe-bottom repair agent related to the present invention, as a wear resistance improving reinforcer, aluminum silicate, calcium silicate, and other silicates, alumina, silica, carbon black, carborundum (silicon carbide), whisker, carbon fiber, glass fiber, iron oxide, and other metal powders, etc. can be mentioned. The wear resistance improving reinforcer is used at 20% by weight or less. When it exceeds 20% by weight, coating, injection, and cast molding workability of the shoe bottom repair agent is degraded and the finished surface tends to become difficult to be smooth.

As a filler of the one-component thermosetting composition of the shoe bottom repair agent of the present invention, calcium carbonate, clay, talc, plastic powders such as acrylic polymer powders, rubber powder, silica sand, glass powder, etc. can be mentioned. The filler is, in general, used in the range of 5 to 50% by weight. When it is less than 5% by weight, it is not economical and when it exceeds 50% by weight, the wear resistance tends to be degraded.

In addition, for other plasticizers, for example, dibutylphthalate, dioctylphthalate, dicyclohexylphthalate, diisooctylphthalate, diisodecylphthalate, dibenzylphthalate, butylbenzylphthalate, trioctylphosphate, epoxy-based plasticizer, toluene-sulfonamide, chloroparaffin, adipate, castor oil, and other plasticizers can be used. For other additives, in addition to the above-mentioned catalysts, oxidation inhibitors, water absorbents, ultraviolet absorbers, age resistors, antioxidants, etc. may be compounded suitably. Furthermore, to match the color of the shoe bottom, a proper amount of dyes and pigments are used to color the shoe bottom to desired colors such as black, gray, rubber color, white, etc.

The one-component thermosetting composition used for the shoe bottom repair agent related to the invention is manufactured by compounding a specified amount of the powder coating amine, latent curing catalyst complex, or block amine as the latent curing agent to the isocyanate component such as the terminal isocyanate group based urethane prepolymer and/or polyisocyanate compound and further compounding a suitable amount of regular filler (talc, calcium carbonate, etc.), plasticizer, pigment, etc. as required. This one-component thermosetting composition is stable at room temperature and provides excellent storage stability and at the same time forms cured matter in a short time by heating to complete repairing of the shoe bottom.

To repair the shoe bottom by use of the shoe-bottom repairing agent related to the present invention as described above, the repair agent is applied, injected, and cast-molded to the portion requiring repairing such as worn portion, lost portion, etc. of shoe soles, heels, etc. for buildup and the surface profile is adjusted by the use of a spatula, etc. to form into the original shoe bottom profile. For example, in the case of repairing a worn heel, a formwork (pattering plate) composed with a plastic sheet with good mold-release property such as polypropylene, etc. is affixed along the outer circumference of the heel, the shoe-bottom repair agent is injected and cast-molded into the formed cast-molding mold, and the surface profile is adjusted by the use of a spatula, etc. In such event, because the bottom-shoe repair agent of the present invention is free from volatilization of the solvent as is the case of the conventional repair agent, and curing scarcely takes place at room temperature, no film is formed on the surface when the surface profile is adjusted and adheres to the spatula, and the repair surface can be finished homogeneously, smoothly, and neatly. Then, the built-up repair agent is heat-cured and the molding of the shoe-bottom repair agent is formed. There is no particular limitation to the heating method when the repair agent is cured, and methods using hot air using a hair dryer, oven, infrared lamp, light globe, microwave oven, etc. can be adopted, but a method to immerse the shoe-bottom portion with the shoe-bottom repair agent built up, for example a heel portion, in the heating liquid tank and to cure is simple and convenient. For the heating liquid used in such event, the use of hot water or warm water is preferable because it is simple and low cost. The temperature of the heating liquid tank in such event is not particularly limited and varies in accord with the kind of the latent curing agents, but needless to say, the higher the temperature, the shorter is the curing time, and the use of a container with large capacity provides greater heat capacity and a high temperature can be maintained. For example, in the case of the one-component thermosetting composition using the powder coating amine as the show bottom repair agent, the repair agent is successfully cured by immersing the repaired portion in hot water or warm water of about 70° C. or higher for about 5 minutes. After curing, removing the formwork, the repair work is completed. Moreover, since the solvent is scarcely contained in the shoe-bottom repair agent, deformation shrinkage (thickness reduction of the mended part) scarcely occurs as observed with the conventional repair agent, and the damaged shoe bottom portion can be mended to the original shape through one-time repair work.

Referring to embodiments, the shoe-bottom repair agent related to the present invention will be specifically described as follows.

MANUFACTURING EXAMPLE 1

Manufacturing of Terminal NCO Containing Prepolymer 73.9 parts by weight of polypropylene ethertriol of average molecular weight of 7000, 14.6 parts by weight of polypropylene etherdiole of average molecular weight of 3000, and 12.5 parts of 4,4'-diphenyl methane diisocyanate were allowed to react at temperature of 80° C. for about 2 hours in the presence of tin octylate, and a terminal NCO containing prepolymer of terminal NCO content of 3.07% and viscosity of 30000 cps/20° C. was obtained.

MANUFACTURING EXAMPLE 2

Manufacturing of Latent Curing Agent (Powder Coating Amine)

76.9 parts by weight of 1,12-dodecandiamine (melting point: 71° C.) of about 8 μm center grain size and 23.1 parts by weight of superfine particle titanium oxide of center grain size of about 0.02 μm were mixed and complex-processed by Hi-X mixer (available from Nisshin Engineering Inc.), and 100 parts by weight of powder coating amine of center grain size of about 8 μm were obtained.

MANUFACTURING EXAMPLE 3

Manufacturing of One-Component Thermosetting Composition 41.5 parts by weight of terminal NCO containing prepolymer of manufacturing example 1, 15.4 parts by weight of polyisocyanate compound (crude MDI), 10.5 parts by weight of latent curing agent (powder coating amine) of manufacturing example 2, 23.1 parts by weight of black toner, and 9.5 parts by weight of filler (ground calcium carbonate) were mixed and dispersed by a Chemistirrer and a one-component thermosetting composition was obtained.

EXPERIMENT 1

Curability

The one-component thermosetting composition prepared in Manufacturing Example 3 was formed into a disc about 38 mm in diameter and 3-10 mm thick and cured by immersing in a 400-mL of a hot water bath (initial water temperature: 100° C.) or by use of a hair dryer (400 W) and the time until the composition was cured was studied. Table 1 shows the results.

TABLE 1

| | Curing test (minute) | | | |
|---|---|---|---|---|
| | 3 mm thick | 5 mm thick | 7 mm thick | 10 mm thick |
| Hot water bath(100° C.) | 1 | 1.5 | 2.5 | 4 |
| Dryer | 2.5 | 3 | 4 | 6 |

As clear from the results of Table 1, the one-component thermosetting composition of the shoe-bottom repair agent related to the present invention cures in as short as about 4-6 minutes even it is built up to 10-mm thickness, and in particular, by immersing it in the heating liquid tank (a hot water bath), it can be cured in a shorter time.

EXPERIMENT 2

Repair of Shoe Bottom

Figure 1:
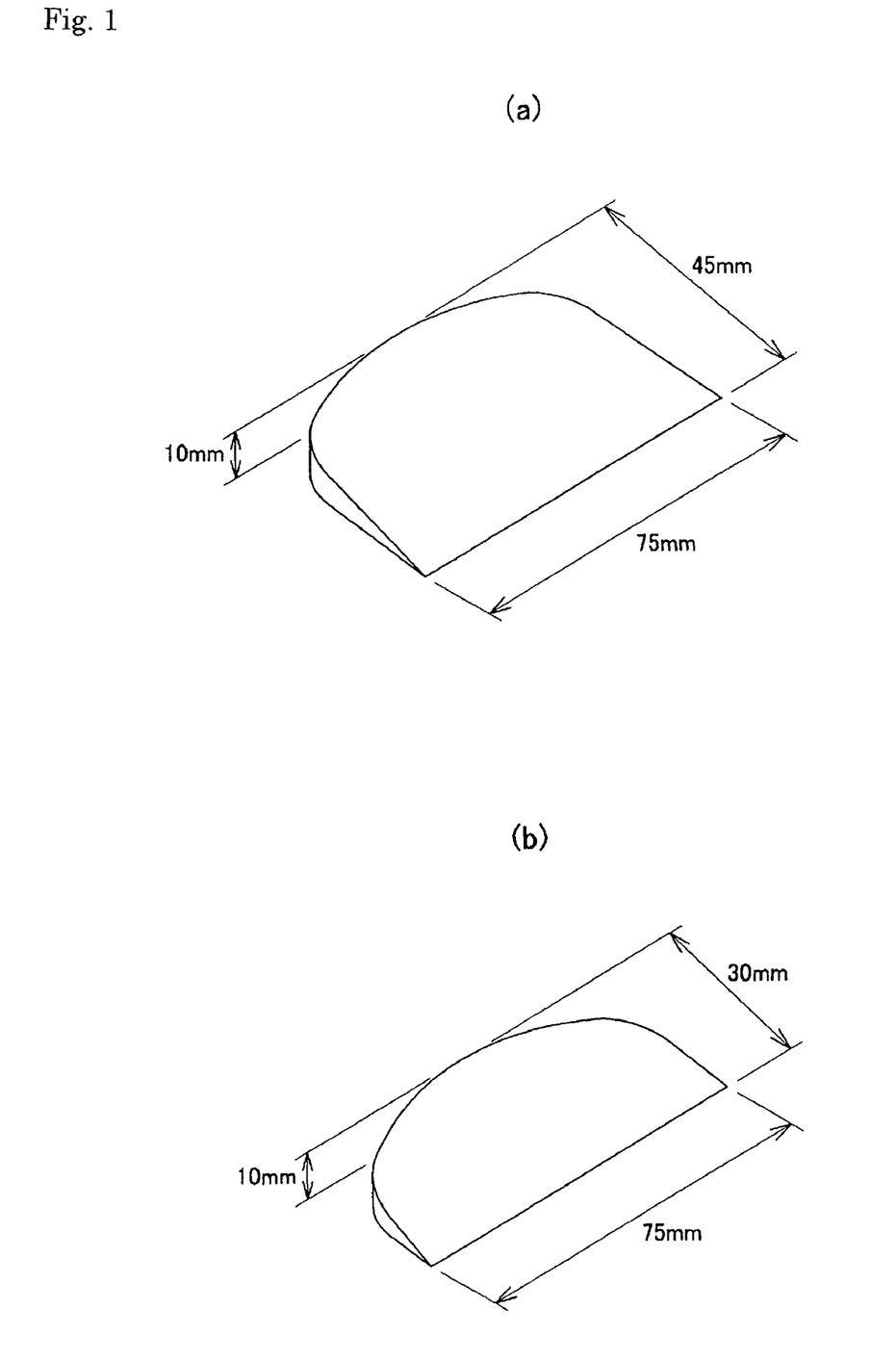

The one-component thermosetting composition prepared in Manufacturing Example 3 was built up on a men's shoe heel portion in the shape and size shown in FIGS. 1(a) and 1(b) as the shoe-bottom repair agent, and the heel portion was immersed in 400 mL of about 80° C. hot water and warm water for 5 minutes to cure the repair agent. When the heel portion was taken out after 5 minutes, the repair agent was satisfactorily cured.

Next description will be made on a shoe-bottom repair set using the above-mentioned shoe-bottom repair agent.

Figure 2:
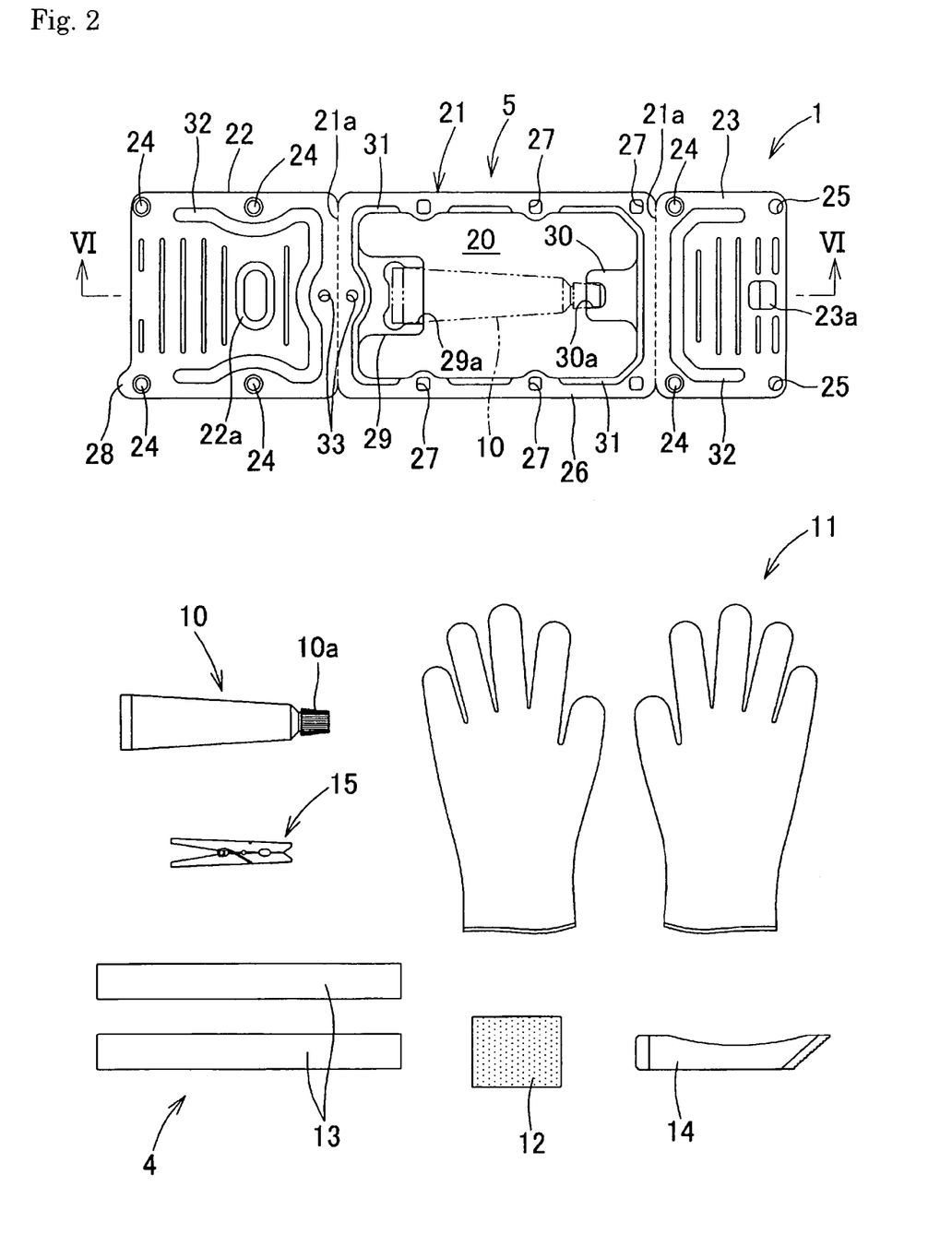
FIG. 2 is an illustration of component members of a shoe-bottom repair set.
Figure 3:
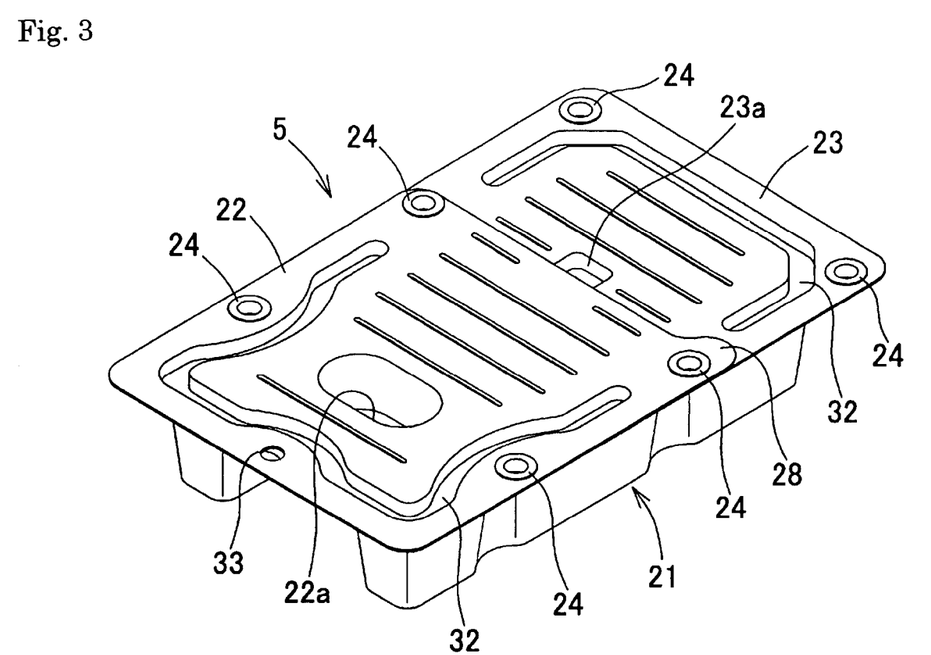
FIG. 3 is a perspective view of a packaging container with the cover closed.
Figure 4:
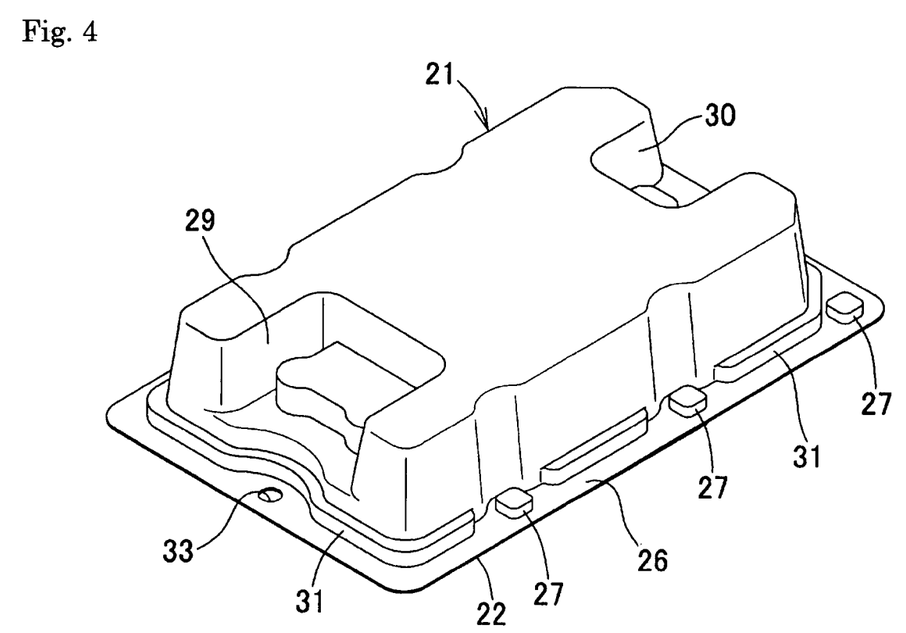
FIG. 4 is a perspective view as seen from the rear side of the packaging container with the cover closed.
Figure 5:
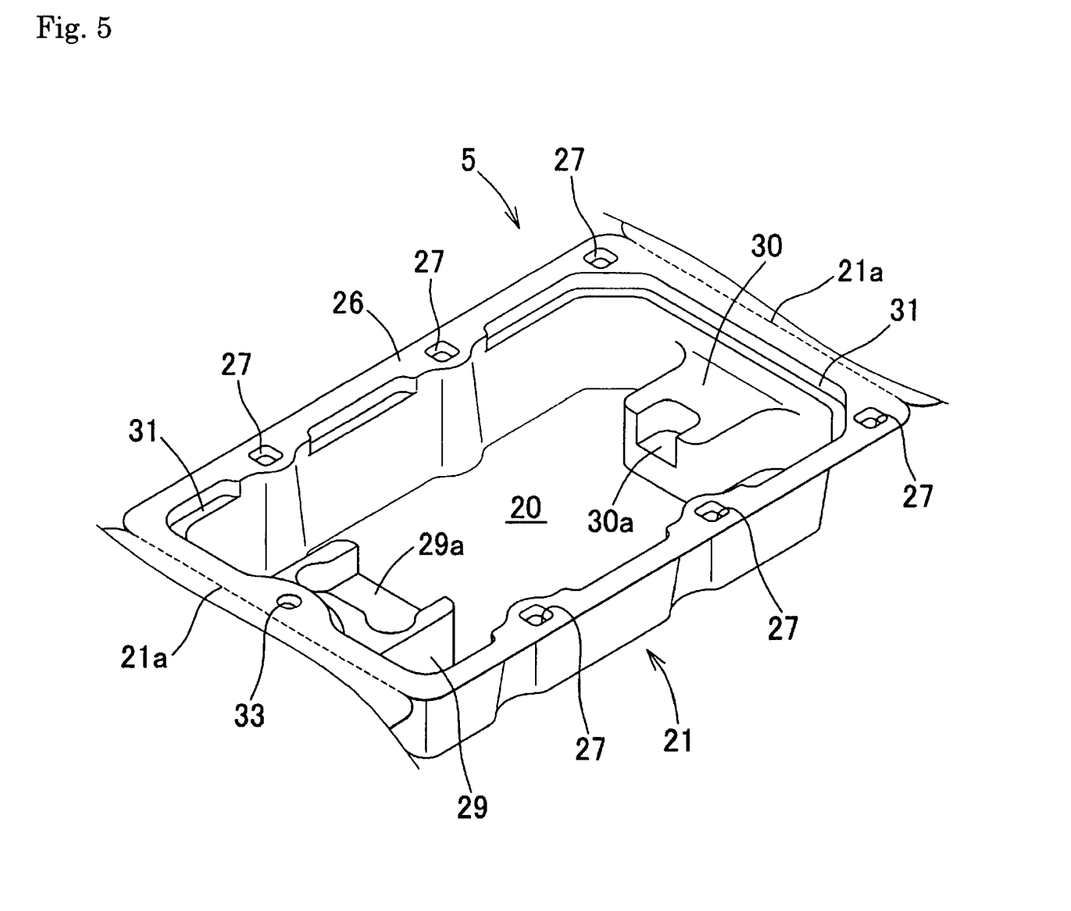
FIG. 5 is a perspective view in the vicinity of the case proper with the cover of the packaging container open.
Figure 6:
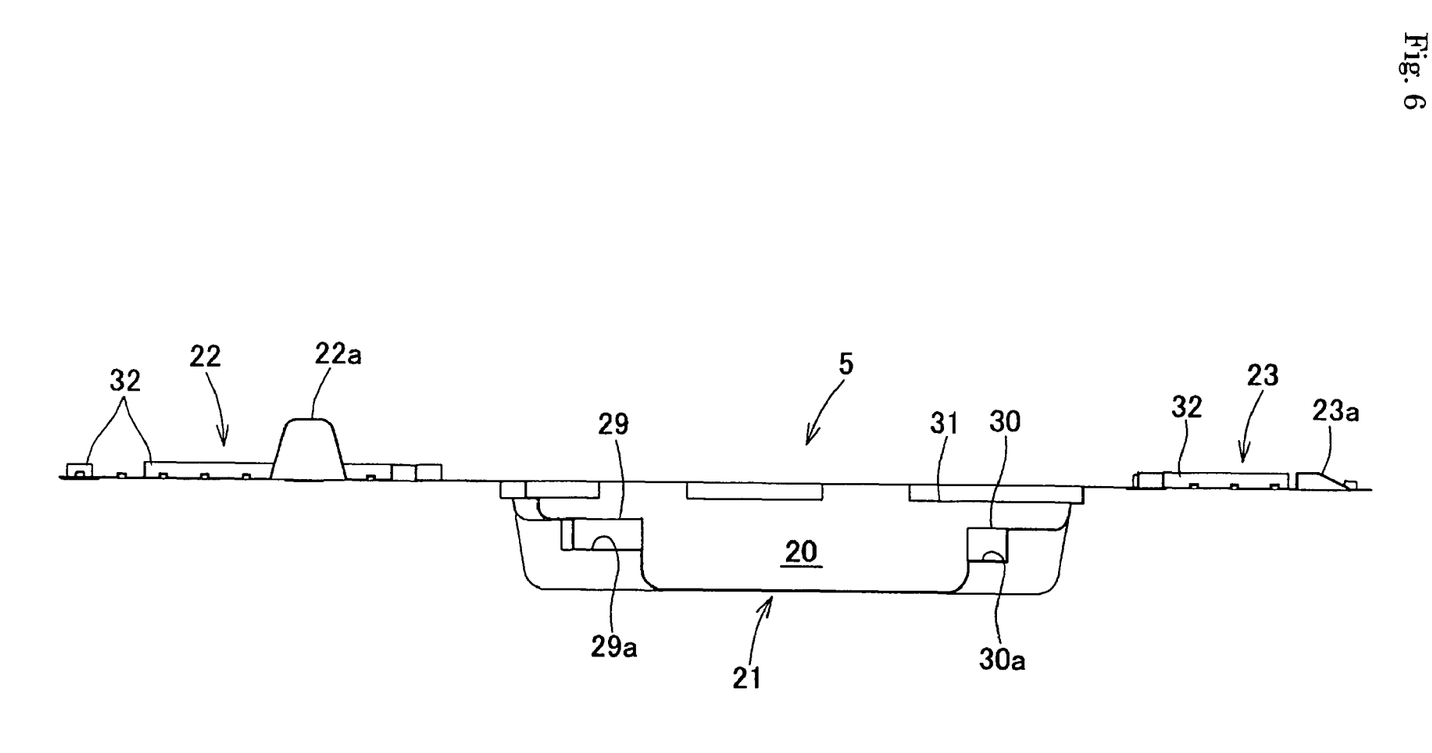
FIG. 6 is a cross-sectional view taken along line VI-VI of FIG. 2.

As shown in FIG. 2, the shoe-bottom repair set 1 is equipped with a shoe-bottom repair tools 4 including a shoe-bottom repair agent container 10 in which a shoe-bottom repair agent 3 (see FIG. 9) which cures by being immersed in hot water or warm water 2 (see FIG. 7 and FIG. 8) is enclosed as well as a packaging container 5 which houses the shoe-bottom repair tool 4. In addition, the packaging container 5 houses the shoe-bottom repair tool 4 including the shoe-bottom repair agent container 10 and at the same time, it is equipped with a container proper 21 with the curing tank and housing recessed portion 20 which functions as a curing tank that can store hot water or warm water 2 to cure the shoe-bottom repair agent 3 by taking out the shoe bottom repair tools 4 when the shoe bottom wear, damage, and lost portions are repaired is recessedly disposed, and a supporting means 6 which supports a shoe S to the curing tank and housing recessed portion 20 of the container proper 21 so that the repaired portion of the heel section H for which the shoe-bottom repair agent 3 is applied, injected, and cast-molded is supported in midair in hot water or warm water 2 poured in the curing tank and housing recessed portion 20 when the shoe S (see FIG. 7 and FIG. 8) such as low-heeled and high-heeled shoes are repaired using the shoe-bottom repair agent 3.

As the shoe-bottom repair tools 4, in addition to the shoe-bottom repair agent container 10, there equipped are gloves 11 for safety protective guard to prevent the shoe-bottom repair agent 3 from adhering to hands and fingers, an emery paper 12 for polishing the surface of the repaired portion of the shoe-bottom SB, 2 sheets of slender formwork sheet 13 for cast-molding made of synthetic resin which can be pasted along the outer edge of the repaired portion, a spatula 14 to apply, inject, and cast-mold the shoe-bottom repair agent 3 to the repaired portion of the shoe S free from any voids and to flatten the surface, a clip 15 to fix the shoe S to the cover members 22, 23 of the packaging container 5, etc. However, in addition to these, cleaning liquid, waste cloth, etc. when the shoe-bottom repair agent 3 adheres to hands and fingers may be equipped.

The shoe bottom repair agent 3 is composed with a high-viscosity liquid or paste one-component thermosetting composition that includes the terminal isocyanate group containing urethane prepolymer and/or polyisocyanate compound and the latent curing agent as main ingredients, as described in the embodiments in detail, and is airtightly enclosed in the shoe-bottom repair agent container 10. This shoe-bottom repair agent 3 is configured to be cured in such a manner that when the shoe-bottom repair agent 3 is immersed and heated in not lower than 70° C. and lower than 100° C. hot water or warm water 2 in the curing tank and housing recessed portion 20 for about 5 minutes, the latent curing agent is activated and the terminal isocyanate group containing urethane prepolymer and/or polyisocyanate compound is addition-polymerized.

For the latent curing agent, it is preferable to use inactivated amine compounds. For the latent curing agent with an amine compound inactivated, the latent curing agent with the amine compound inactivated by fixing powders to the solid amine surface, complex with boron halide added to the amine compound, or amine compound blocked by homopolymer or copolymer of phenols which have a polymerizable double bond can be used. By the way, the shoe-bottom repair agent 3 composed with optional material may be adopted as far as it is cured by immersing in hot water or warm water and exhibits rubber elasticity of a level same as that of the shoe-bottom SB after curing.

The packaging container 5 of the shoe-bottom repair set 1 is made from heat resistance resin sheet that can stand at least 100° C. hot water because the packaging container 5 gives the curing tank and housing recessed portion 20 recessedly provided to the container proper 21 the function as a container that houses the shoe-bottom repair agent container 10, etc. and the function as a curing tank 20 to be filled with hot water or warm water. This packaging container 5 is a container that houses the shoe-bottom repair tools 4 as shown in FIG. 2 through FIG. 6 and at the same time, it is equipped with a container proper 21 which has the curing tank and housing recessed portion 20 that serves as a curing tank to be filled with hot water or warm water, and a pair of cover members 22, 23 with varying lengths rotatably installed via an integral hinge 21*a* on both sides of the container proper 21. The capacity of the curing tank and the housing recessed portion 20 is set to about 500 mL so that the curing tank and the housing recessed portion 20 is filled with hot water or warm water and the repaired portion of the shoe S is maintained to 70° C. or higher at least for 5 minutes with the repaired portion of the shoes immersed.

The free end portion of both cover members 22, 23 are closed with a predetermined width overlapped, at the free end portion of the longer cover member 22 and the halfway portion, a pair of fit-protruded portions 24 are formed, respectively, and at the root part of the shorter cover member 23, a pair of fit-protruded portions 24 are formed, at the free end portion of the shorter cover member 23, an insertion hole 25 is formed, on the outer circumferential portion of the container proper 21, a flange portion 26 is formed, to the flange portion 26, fit-recessed portions 27 which protrudably and recessedly fit to the fit-protruded portions 24 and hold the cover members 22, 23 to the blocked position are formed to correspond with six fit-protruded portions 24.

In the vicinity of one fit-protruded portion 24 in the free-end portion of the longer cover member 22, a knob portion 28 that protrudes outwards is formed, and it may be configured to pinch this knob portion 28 and easily open the longer cover member 22. The fit-protruded portion 24 of the free end portion of the longer cover member 22 can be protrudably and recessedly fitted to the fit-recessed portion 27 of the container proper 21 by inserting through the insertion hole 25 of the shorter cover member 23 or the fit-protrusions and fit-recessions may be separately installed at proper places, and in addition, fit-protruded portions 24 of the quantity other than 6 may be formed in the cover members 22, 23 and the cover members 22, 23 may be held to the container proper 21 in the closed-cover condition, or the cover members 22, 23 may be held to the container proper 21 in the closed-cover condition by the construction other than recessed and protruded fittings of the fit-protruded portion 24 and fit-recessed portion 27.

To the container proper 21 and longer cover member 22, a hook hole 33 for display is formed, and the packaging container 5 is configured to be displayed in the vertical position with the hook hole 33 side set to the topside. At the nearly center in the width direction of the container proper 21, a pair of top and bottom loading tables 29, 30 are formed protrudably toward the inside of the housing portion 20, and in the loading tables 29, 30, holding recessed portions 29*a*, 30*a* that hold both end portions of the shoe-bottom repair agent container 10 are formed, and the shoe-bottom repair agent container 10 is set in the vertical direction on the loading tables 29, 30 with the cap 10*a* directed downside. In the longer cover member 22 and the shorter cover member 23, holding protrusions 22*a*, 23*a* are formed to hold the shoe-bottom repair agent container 10 which is set to the loading tables 29, 30, and the shoe-bottom repair agent container 10 is restrained by the loading tables 29, 30 and holding protrusions 22*a*, 23*a* with care to prevent the container from moving in the cover-closed state.

In the opening edge portion of the curing tank and housing recessed portion 20, level difference portions 31 are formed and in the longer cover member 22 and the shorter cover member 23, nearly inverted C-letter shape reinforcement protrusions 32 which fit to the level difference portions 31 are formed. It is configured to use the level difference portion 31 for a good-rule-of-thumb to easily grasp the optimum injection hot water volume into the curing tank and the housing recessed portion 20 or to utilize it as a support means 6 (FIG. 7) that supports the heel portion H of a shoe S at the cover members 22, 23 because the strength and rigidity of the cover members 22, 23 are increased by the reinforcement protrusion 32.

Figure 7:
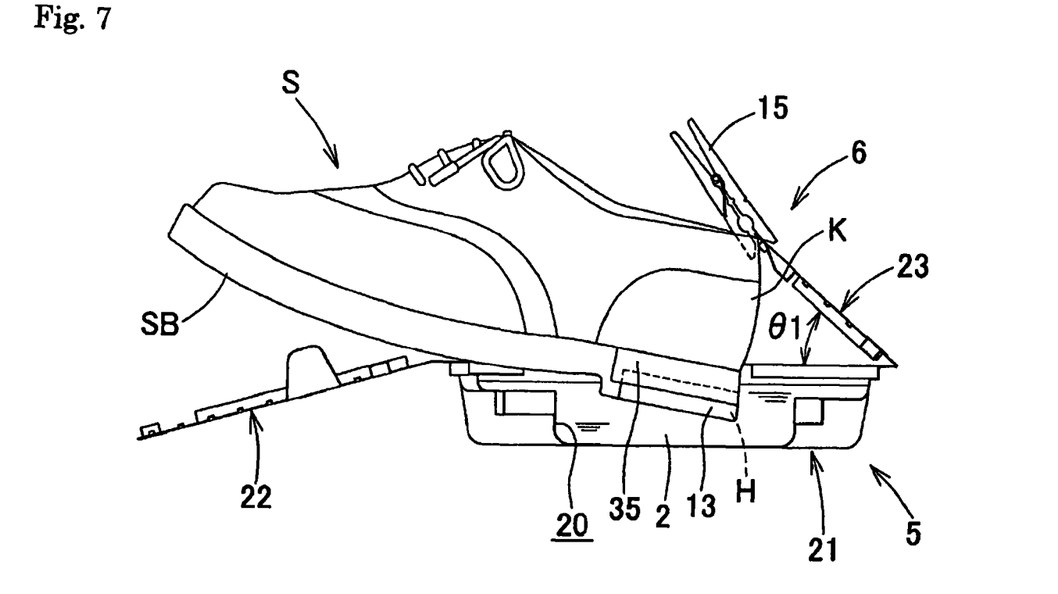
FIG. 7 is an illustration when a low-heeled shoe is supported with the shoe immersed in hot water or warm water in the curing tank.
Figure 8:
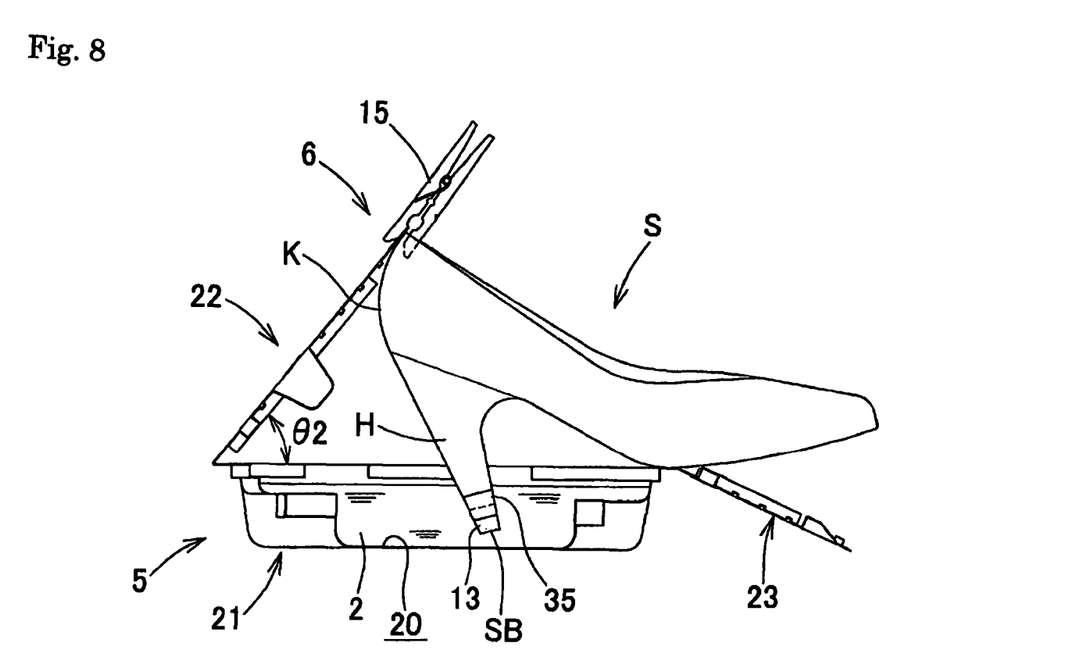
FIG. 8 is an illustration when a high-heeled shoe is supported with the shoe immersed in hot water or warm water in the curing tank.
Figure 9:
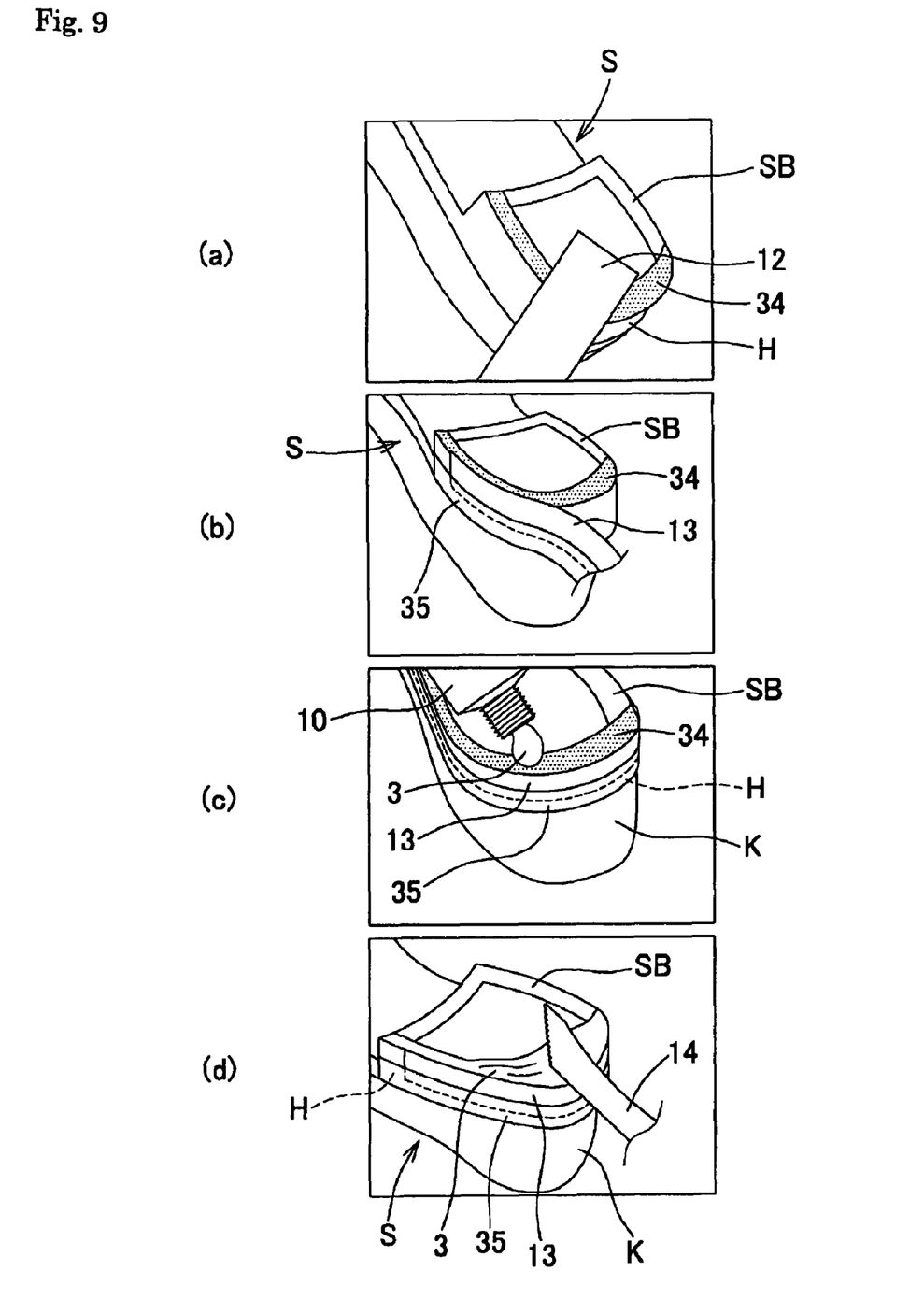
FIGS. 9A through 9D are illustrations of a repair method of shoe bottom.

The support means 6 is configured with both cover members 22, 23 and a clip 15, and as shown in FIG. 7, when a low-heeled shoe S is repaired, the top end portion of the counter portion K of the shoe S is fixed to the top end portion of the shorter cover member 23 by the clip 15, and the tilting angle θ1 of the shorter cover member 23 is adjusted so that the shoe-bottom repaired portion to which the shoe-repair agent 3 is coated, injected, and cast-molded is wholly immersed in hot water or warm water 2 stored in the curing tank and the housing recessed portion 20. On the other hand, as shown in FIG. 8, when a high-heeled shoe S is repaired, the top end portion of the counter portion K of the shoe S is fixed to the top end portion of the longer cover member 22 with a clip 15, and the tilting angle θ2 of the longer cover member 22 is adjusted so that the shoe-bottom restored or repaired by the shoe-repair agent 3 is wholly immersed in hot water or warm water 2 poured into the curing tank and the housing recessed portion 20.

Now, description will be made on the repairing method of shoe bottom SB using this shoe-bottom repair set 1.

As shown in FIG. 9(a), stains and moisture of the shoe bottom SB are removed and the surface 34 where the shoe bottom must be repaired is roughened by an emery paper 12.

Then, as shown in FIG. 9(b), the cast-molding formwork sheet 13, one of the shoe-bottom repair tools 4 is affixed along the outer circumference of a heel H by an adhesive tape 35 with nearly closely leaving no space between them. In such event, affixing the formwork sheet 13 in such a manner that the bottom edge of the formwork sheet 13 achieves nearly same height as the bottom surface of the heel portion H enables the shoe-bottom repair agent 3 to be applied, injected, and cast-molded with the bottom edge of the formwork sheet 13 used as a reference and to be built up and finished to a profile nearly similar to that when the shoe was purchased.

Then, with gloves 11 on, as shown in FIG. 9(c), while the shoe-bottom repair agent 3 is being squeezed from the shoe-bottom repair agent container 10, a required amount of shoe bottom repair agent 3 is applied, injected, and cast-molded to the repaired surface 34 of the heel portion H. In such event, the shoe-bottom repair agent 3 must be applied and injected with care to prevent air bubbles from being included in the cast-molded and built-up shoe-bottom repair agent 3 and at the same time, with care to thoroughly fill in the clearance between the formwork sheet 13 and the heel H with the shoe-bottom repair agent 3.

Next, as shown in FIG. 9(d), the built-up shoe-bottom repair agent 3 is spread with the spatula 14 and the profile and the surface condition of the shoe-bottom repair agent 3 are adjusted so that the shoe bottom SB is restored to the original profile before wearing.

In this way, after applying, injecting, and cast-molding the shoe-bottom repair agent 3 to the shoe bottom SB, as shown in FIG. 7, with care to prevent the shoe-bottom repair agent 3 from coming in contact with other things, the top end portion of the counter portion K of the shoe S is fixed to the top end portion of the shorter cover member 23 with a clip 15, at the same time, with the repaired portion supported in midair in order to be immersed in hot water or warm water 2 of the curing tank and housing recessed portion 20, hot water or warm water 2 is poured from kettle, etc. into the curing tank and housing recessed portion 20, and the shoe-bottom repair agent 3 is immersed in hot water or warm water 2 and cured. However, it is possible to fix the shoe S to the cover members 22, 23 which are the support means after filling the curing tank and housing recessed portion 20 with hot water or warm water 2 in advance.

In this way, after the shoe-bottom repair agent 3 is cured, the formwork sheet 13 is peeled off, burr is removed from the repaired portion, the profile is further adjusted by a utility knife, etc., and repairing of one shoe S is completed, and the same repair work is conducted on the other shoe S, and repairing of right and left shoes S is completed.

Figure 10:
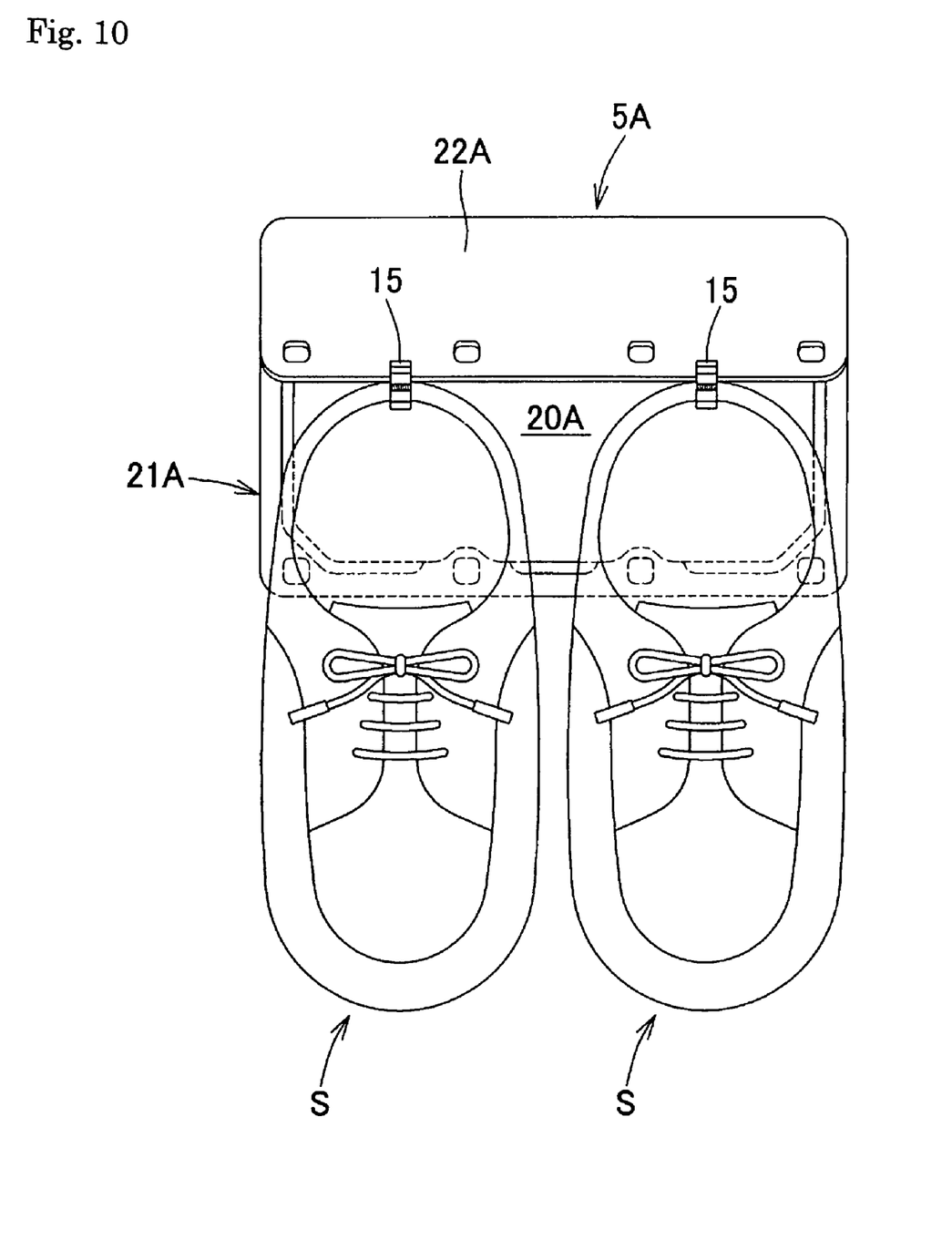
FIG. 10 is an illustration of a shoe repairing method using a packaging container of other configuration.

In the present embodiment, the shoe S is repaired one at a time, but as is the case of the container proper 21A shown in FIG. 10, the length of the container proper 21A is set to the length which can accommodate both right and left shoes S, the cover member 22A is installed free to open and close on one side along the longitudinal direction of the container proper 21A, the top end portions of the counter portions K of the shoes S are fixed and supported to the cover member 22A by clips 15, and the repaired portions of the right and left shoes S are simultaneously immersed in hot water or warm water filled in the curing tank and housing recessed portion 20A, and the right and left shoes S can be simultaneously repaired.

Furthermore, because the shoe S is supported with the cover members 22, 23 tilted, the opening portion for injecting hot water or warm water in the curing tank and the housing recessed portion 20 with the shoe S supported may be formed at the root portion on the rotation center side of the cover members 22, 23.

In addition, in the present embodiment, the shoe S is supported by the cover members 22, 23, but one to multiple support walls that support the halfway portion of the length direction of the shoe S may be formed in the packaging container 5 and the shoe S may be supported in such a manner that the heel portion H is immersed in hot water or warm water 2 by the support walls.

In the present embodiment, cases to repair the heel portion H of the shoe S were explained, but the worn portions or damaged portions at optional positions of the shoe bottom SB can be repaired simply, easily, safely, without taking time and labor by use of the shoe-bottom repair agent 3 in the same manner as described above.

In the present invention, a shoe-bottom repair set was discussed, but needless to say, the shoe-bottom repair agent and the shoe-bottom repair tools of the claimed invention can be used for restoration and repair of worm, lost, and damaged portions of various moldings, rubber products, etc.

The invention claimed is:

1. A shoe bottom repair agent, comprising:
    a one-component thermosetting composition containing a terminal isocyanate group containing urethane prepolymer and/or a polyisocyanate compound and a latent curing agent as main ingredients.

2. The shoe bottom repair agent according to claim 1, wherein
    the one-component thermosetting composition uses at the same time a terminal isocyanate group containing urethane prepolymer and a polyisocyanate compound.

3. The shoe bottom repair agent according to claim 1, wherein
    the latent curing agent is an inactivated amine compound.

4. The shoe bottom repair agent according to claim 3, wherein
    the latent curing agent is one or two kinds chosen from powder coating amine with powder firmly fixed to the surface of a solid amine compound, complex with boron halide added to an amine compound, or block amine with an amine compound blocked with homopolymer or copolymer of phenols which have a polymerizable double bond.

5. The shoe bottom repair agent according to claim 1, wherein
the one-component thermosetting composition cures at 70° C. or higher and less than 100° C.

6. The shoe bottom repair agent according to claim 5, wherein
the shoe bottom repair agent is cured by immersing in heating liquid.

7. The shoe bottom repair agent according to claim 6, wherein
the heating liquid is hot water or warm water.

8. A shoe bottom repair method, comprising steps of:
applying, injecting, or cast-molding the shoe bottom repair agent according to claim 1 to a repaired portion of shoe bottom; and
immersing the repaired portion into a heating liquid tank to cure the shoe-bottom repair agent.

9. The shoe bottom repair method according to claim 8, further comprising steps of:
injecting the shoe bottom repair agent into a cast-molding mold formed on the repair portion of the shoe bottom by a formwork;
immersing the repair portion into the heating liquid tank to cure the shoe bottom repair agent; and
removing the formwork.

10. The shoe bottom repair method according to claim 8, wherein
the heating liquid is hot water or warm water.

11. A shoe bottom repaired shoe characterized in that the shoe bottom is repaired by the shoe bottom repair method according to claim 8.

12. A shoe bottom repair set, comprising:
shoe-bottom repair tools such as a shoe bottom repair agent container filled with the shoe bottom repair agent according to claim 1, formwork sheet for cast molding, surface-finishing spatula, etc.; and
a packaging container having a container proper which houses the shoe bottom repair tools such as the shoe bottom repair agent container, etc. and at the same time, which has a curing tank and housing recessed portion which functions as a curing tank for storing hot water or warm water to cure the shoe bottom repair agent when worn, damaged, or lost portion of the shoe bottom is repaired.

13. The shoe bottom repair set according to claim 12, wherein
a support means is provided for supporting a shoe so that the shoe bottom repair portion of the shoe to be repaired is immersed in hot water or warm water stored in the curing tank and the housing recessed portion.

14. The shoe bottom repair set according to claim 13, wherein
a cover member is installed to the packaging container as the support means.

15. The shoe bottom repair set according to claim 13, wherein
the cover member which opens and closes the curing tank and the housing recessed portion is rotatably installed at least on one side of the packaging container as the support means, the top end portion of the counter part of a shoe is latched to the cover member with the top end part of the counter part of the shoe raised by a clip, and the shoe bottom repair portion is able to be immersed in hot water or warm water stored in the curing tank and the housing recessed portion.

16. The shoe bottom repair set according to claim 13, wherein
as the cover member, a pair of cover members which open and close the curing tank and housing recessed portion are rotatably installed to both sides of the packaging container, the length of one cover member is set to be longer than the other cover member, and the top end portion of the counter part of a high-heeled shoe is able to be latched to the longer-side cover member with a clip and the top end portion of the counter part of a low-heeled shoe is able to be latched to the shorter side cover member with a clip.

17. The shoe bottom repair set according to claim 14, wherein
as the cover member, a cover member that opens and closes the curing tank and housing recessed portion is rotatably installed to one side along the longitudinal direction of the packaging container, and the top end portions of counter parts of right and left shows are able to be latched to the raised cover member with clips.

18. The shoe bottom repair set according to claim 13, wherein
as the support means, a support wall supporting the halfway portion of the length direction of a shoe is formed in the packaging container.

19. The shoe bottom repair set according to claim 12, wherein
the shoe-bottom repair agent container is located nearly at the center of the width direction of the curing tank and housing recessed portion so that its longitudinal direction is set as the vertical direction and the cap is located on the downside.

20. The shoe bottom repair set according to claim 12, wherein
a cover member which opens and closes the curing tank and housing recessed portion is rotatably installed to at least one side of the packaging container and a protrusion is formed in the cover member to fix and hold the shoe-bottom repair agent container at a predetermined position inside the curing tank and the housing recessed portion.

21. The shoe bottom repair set according to claim 12, wherein
a cover member is rotatably installed at least to one side of the packaging container and in the cover member, an opening to pour hot water or warm water into the curing tank and housing recessed portion.

* * * * *